United States Patent [19]

den Toonder et al.

[11] 4,323,922
[45] Apr. 6, 1982

[54] TELEVISION CODING SYSTEM WITH CHANNEL LEVEL IDENTIFICATION

[75] Inventors: Pieter den Toonder, Dordrecht, Netherlands; Glenn P. Doles, Wonder Lake, Ill.; John A. Lund, McHenry Shore's, Ill.; Richard G. Merrell, Hebron, Ill.; Graham S. Stubbs, Poway, Calif.

[73] Assignee: Oak Industries Inc., Rancho Bernardo, Calif.

[21] Appl. No.: 104,147

[22] Filed: Dec. 17, 1979
(Under 37 CFR 1.47)

[51] Int. Cl.³ .................................................. H04N 7/16
[52] U.S. Cl. ..................... 358/117; 358/118; 358/120
[58] Field of Search ................ 358/117, 118, 120, 124

[56] References Cited

U.S. PATENT DOCUMENTS

| | | | |
|---|---|---|---|
| 3,538,243 | 11/1970 | Shanahan et al. | 358/115 |
| 3,689,688 | 9/1972 | Shanahan et al. | 358/118 |
| 3,696,297 | 10/1972 | Otero | 455/4 |
| 3,777,053 | 12/1973 | Wittig et al. | 358/117 |
| 3,790,700 | 2/1974 | Callais et al. | 358/84 |
| 3,801,732 | 4/1974 | Reeves | 358/124 |
| 3,845,391 | 10/1974 | Crosby | 455/39 |
| 3,885,089 | 5/1975 | Callais et al. | 358/122 |
| 3,885,217 | 5/1975 | Cintron | 455/39 |
| 3,890,461 | 6/1975 | Vogelman et al. | 358/115 |
| 3,899,633 | 8/1975 | Sorenson | 358/117 |
| 3,916,091 | 10/1975 | Kirk, Jr. et al. | 358/86 |
| 3,919,462 | 11/1975 | Hartung et al. | 358/117 |
| 3,934,079 | 1/1976 | Barnhart | 358/86 |
| 3,975,585 | 8/1976 | Kirk, Jr. et al. | 358/86 |
| 4,019,201 | 4/1977 | Hartung et al. | 358/124 |
| 4,024,575 | 5/1977 | Harney et al. | 358/118 |
| 4,024,576 | 5/1977 | Hartung et al. | 358/124 |
| 4,045,814 | 8/1977 | Hartung et al. | 358/124 |
| 4,058,830 | 11/1977 | Guinet et al. | 358/86 |
| 4,068,264 | 1/1978 | Pires | 358/122 |
| 4,079,419 | 3/1978 | Siegle et al. | 358/117 |
| 4,081,831 | 3/1978 | Tang et al. | 358/124 |
| 4,091,417 | 5/1978 | Nieson | 358/117 |
| 4,112,464 | 5/1978 | Guif et al. | 358/117 |
| 4,130,833 | 12/1978 | Chomet | 358/122 |
| 4,163,254 | 7/1979 | Block et al. | 358/122 |
| 4,215,366 | 7/1980 | Davidson | 358/124 |

*Primary Examiner*—S. C. Buczinski
*Attorney, Agent, or Firm*—Kinzer, Plyer, Dorn & McEachran

[57] ABSTRACT

A converter/decoder for use in subscription television includes means for converting any input TV channel to a predetermined output channel. Decoding means are connected to the converter at its output for decoding the selected output channel. The decoder is enabled in response to data carried on the TV signal which describes the program level of the particular selected channel. The means for enabling the decoder includes a comparison circuit which compares the television signal program level data with authorization data and performs an enabling function when there is correspondence between the two data entries. The authorization data may be received by the converter/decoder simultaneously with the program level data, but at a frequency other than that of the television signal, for example, at a frequency in the FM band.

12 Claims, 2 Drawing Figures

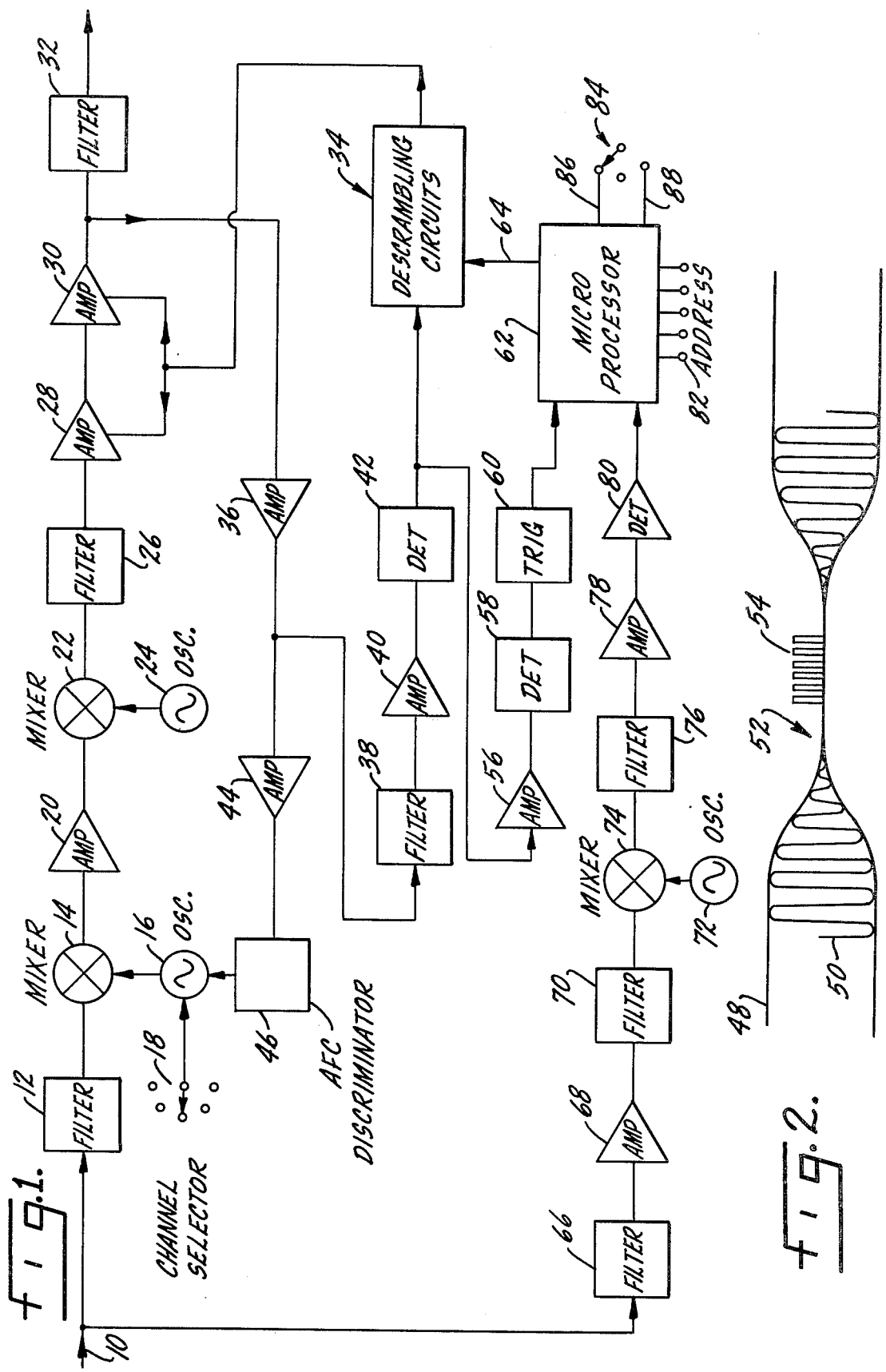

TELEVISION CODING SYSTEM WITH CHANNEL LEVEL IDENTIFICATION

SUMMARY OF THE INVENTION

The present invention relates to converter/decoders for use in subscription television or the like and has particular reference to means for enabling a subscriber's decoder in response to program level information carried by the television signal and compared with authorization data at the decoder.

One purpose is a converter/decoder of the type described which provides means for the subscriber to receive different levels of subscription programming.

Another purpose is a converter/decoder of the type described in which program level information is carried by the television signal with address, authorization and other data information being carried on a separate channel, preferably at a frequency other than that of a TV signal.

Another purpose is a subscription television system in which each program carries data indicative of its program level and in which the program level data is compared at the decoder with authorization data.

Another purpose is a converter/decoder of the type described in which the subscription signal is coded by the application of sine wave amplitude modulation, which modulation is suppressed during the television signal vertical interval, with the program level data being inserted during the vertical interval.

Another purpose is a subscription television system of the type described in which program level information is carried by the TV signal and in which authorization data is transmitted to each subscriber at a frequency other than that of the TV signal, for example the FM band, which authorization data includes the subscriber's address, program level information, as well as an on-off signal to control operation of the decoder.

Other purposes will appear in the ensuing specification, drawings and claims.

BRIEF DESCRIPTION OF THE DRAWINGS

The invention is illustrated diagrammatically in the following drawings wherein:

FIG. 1 is a schematic illustration of a converter/decoder of the type described, and FIG. 2 is a wave form diagram illustrating the application of a coding signal and program level data superimposed thereon.

DESCRIPTION OF THE PREFERRED EMBODIMENT

The cable television industry, as well as subscription television in general, is experiencing a substantial increase in the availability of premium programming, distribution channels for television signals by satellite and a variety of text, news wire and other information systems suitable for television display. The present invention is particularly concerned with means for controlling the distribution of these services so as to generate the maximum revenue for the cable operator and yet provide the greatest range of available services for each individual subscriber at a pricing package designed for each subscriber.

The present invention relates specifically to subscription television, for example as applied to cable (CATV), over-the-air (STV) or master antenna (MATV). Basically, a converter/decoder is provided which can receive multiple television input channels, for example 35 or more. The converter portion of the unit which may generally convert signals in the manner described in U.S. Pat. No. 3,333,198 will provide an output of the selected channel. The selected channel may or may not have a coded or scrambled signal thereon. If the selected channel has a coded signal, the decoder portion of the unit will decode the television signal if the unit has been authorized to receive programs at that particular program level. Program level is intended to describe a classification of entertainment, for example, sports, musical productions or movies of a certain rating.

Assuming operation in a CATV system, the cable operator, through remote, for example, computer control at the head end, will provide control signals for each individual subscriber. The control signals will include the address of the subscriber, an on/off signal for the subscriber's decoder and information relative to the program level which the subscriber desires to receive and pay for. Such control signals may preferably be transmitted on a band other than that of the TV spectrum, for example the FM band, and will be transmitted on a periodic basis. Each subscription program, regardless of the channel on which it is transmitted, will have a program level "tag" superimposed on it. If a particular subscriber desires to receive programs at that particular level, the decoder unit will compare the tag on the television signal with the program level authorized for a particular subscriber and if there is a valid comparison, the decoder will then be enabled. No particular channel is dedicated to subscription television, rather, programs are individually coded and tagged and a subscriber determines which level of subscription programming he desires to receive. The cable operator through his computer controlled head end will regulate which programs are received by which subscribers and whether a particular subscriber is authorized to receive any subscription programs at all.

Looking specifically at FIG. 1, and again assuming operation in a CATV system, the input for the converter/decoder is indicated at 10, which input is connected to a filter 12 which will remove all signals other than those in the conventional cable transmitted TV spectrum. Connected to the filter 12 is a first mixer 14 which in turn is connected to a variable oscillator 16 whose output frequency is controlled by a channel selector 18. The subscriber conventionally chooses the channel he wishes to receive in a converter of the present type and a frequency consistent with converting the selected channel to a standard intermediate frequency is then provided at mixer 14 from oscillator 16. The output from mixer 14 is connected to an intermediate frequency amplifier 20 which will then amplify the common IF frequency at the output of mixer 14. Amplifier 20 is connected to a second mixer 22 which in turn receives a signal from oscillator 24. The output from mixer 22, which will be a selected channel for display on the subscriber's set, customarily a channel not used in that geographical area, is passed to a filter 26 which removes any extraneous signals which might be present at that point. The converter operation or the conversion step described is generally the same as that shown in U.S. Pat. Nos. 3,333,198 and 4,024,575.

If the particular selected channel has a subscription program which has been coded at the head end, then the television signal must be decoded. The decoding functions are performed generally in the manner shown in U.S. Pat. No. 4,024,575, assuming that the coding at the head end is sine wave amplitude modulation. The decoding process will not be described in detail, as it is disclosed in the above patent.

The output of filter 26 is connected to a first RF amplifier 28 whose output is connected to a second RF amplifier 30. The output from amplifier 30 is connected to a filter 32 which in turn provides the cable input for a television receiver. Both amplifiers 28 and 30 receive decoding signals from a descrambling circuit indicated generally at 34 which may be of the type shown in U.S. Pat. No. 4,145,717. In sine wave amplitude modulation coding, the audio signal carries a greater level of modulation than the video signal. The signal for decoding is taken from the output of amplifier 30, passes through an amplifier 36, which in turn is connected to a filter 38. The output from filter 38 is connected to an amplifier 40 and the amplifier in turn is connected to a detector 42 which provides an output signal at 15.75 khz, the decoding frequency. Detector 42 is connected to the descrambling circuits 34 which circuits will be activated, as described hereinafter, assuming the transmitted control data authorizes a particular subscriber.

An automatic frequency control loop for the converter/decoder includes amplifier 36, a second amplifier 44 and an AFC discriminator 46 whose output is connected to variable oscillator 16. All of the above circuits are disclosed in one or more of the specified patents.

Looking specifically at FIG. 2, there is diagrammatically illustrated an application of the type of coding signal described. The coding envelope, indicated at 48, includes a sine wave of 15.75 khz, which modulation is applied to the audio and video signals prior to the application of the composite signal to the transmitting carrier. The sine wave amplitude modulation is, however, suppressed during the period of the video signal vertical interval and this suppression is indicated generally by arrow 52. Since there is no sine wave amplitude modulation during the vertical interval, it is possible to insert control data at this point on the audio signal. Such data is indicated by a burst of pulses 54 which, in the preferred form, are time varying pulses with the length of the pulse burst providing certain data. As indicated previously, each coded program is tagged with a program level and whether or not that signal is decoded is determined by whether or not the subscriber has been authorized to receive that level of programming. For example, assuming eight separate levels of programming, four bits are required to transmit appropriate program level data. A one-bit may have a duration of 200 microseconds, a zero-bit a duration of 300 microseconds and a start bit customarily used in data transmission may have a time duration of 100 microseconds. Each control message will consist of four successive vertical intervals, with one burst of pulses or message bit in each interval. The frequency of the pulse burst is chosen so as not to interfere with the decoding function, for example seven times the coding frequency. Thus, the audio signal of each coded television signal will contain at a point in time corresponding to the video vertical interval where the coding or scrambling is suppressed, data indicative of the level of that particular program. In this connection, the absence of such data indicates that no decoding function is to take place and the device will operate as a conventional converter. The tag, as the data is called, is provided at the input of an amplifier 56 which is connected to the output of detector 42. The output of the detector is is the envelope shown in FIG. 2 with the data superimposed during a vertical interval. Amplifier 56 is connected to a detector 58 whose output is a series of pulses representative of the tag information. A Schmitt trigger 60 is connected to detector 58 and is used to provide a properly framed and formed pulse series representative of the tag data. The output from trigger 60 is connected to a microprocessor 62, described in more detail hereinafter. The microprocessor has an output along line 64 which will control operation of the descrambling circuit 34.

The control information for authorizing each subscriber to receive a particular level of programming and to maintain the subscriber's converter/decoder in an enabled condition may be transmitted at a frequency other than that of the TV spectrum, for example in the FM band. This is not a requirement, but it is convenient. Thus, a filter 66 is connected to the converter/decoder input 10 and will provide an output at 104.75 mhz which has been found to be a satisfactory frequency for the control information. The output from filter 66 is connected to an amplifier 68 whose output is connected to a second filter 70. A fixed oscillator 72, for example having a frequency of 115.45 mhz, is connected to a mixer 74 with the output of the mixer being a 10.7 mhz signal which is passed through a filter 76 and successively an IF amplifier 78 and FM detector 80. The output from detector 80 is connected to microprocessor 62. The microprocessor will have an individual hardwired address for each subscriber and this address is represented by terminals 82.

As it is occasionally desirable for a subscriber to prevent certain levels of programming being received by certain members of the family, for example to restrict the viewing of adult moves by children, a keylock switch is indicated generally at 84 and has two inputs to the microprocessor indicated at 86 and 88. Depending upon the position of the keylock switch, certain levels of programming can be disabled in the microprocessor. The center terminal in switch 84 will permit all levels of programming to pass through the microprocessor and decoder. Whereas, connection to either lines 86 or 88 will prevent certain levels of programming from being processed.

The microprocessor may be of the family manufactured by Motorola and designated as 6805. It is customary in the trade for an individual desiring to use such a microprocessor to designate the functions to be performed by it. The manufacturer, for example Motorola, will then provide a 6805 microprocessor manufactured to perform certain designated functions. In the present instance the microprocessor will examine incoming data from detector 80 to determine if in fact the address included in the data corresponds to that of a particular subscriber. If there is address correspondence, the data indicative of program level, as well as an on/off data bit, will be stored in the microprocessor memory. When tag information is received from trigger 60, this tag information or data is compared with the program level in the microprocessor and if there is correspondence, then an enabling signal will pass over line 64 to the descrambling circuits 34.

In the present system the message sent out from the CATV system head end will include the conventional initiating start bit followed by a 22-bit address. It is this address which the microprocessor compares with the hardwired address. Following the address is a nine-bit data message with the first bit being an on/off bit to control the operation of the decoder portion of the converter/decoder. Following the on/off bit is an eight-bit code indicative of the authorized program level. The data bits are all stored in the microprocessor memory. As indicated above, when there is a subscription program which is coded in the manner described, and when the tag is detected from such signal in the manner described, there will be a tag data input to the microprocessor. If the tag level is the same as one of the levels of programming authorized for a particular subscriber, then the microprocessor will provide an enabling signal for descrambling circuit 34 which will permit the descrambling or decoding function to take place. If the tag level does not correspond with that stored in the microprocessor, decoding will not take place.

Descrambling circuit 34 has three outputs. The first is a D.C. level which will permit amplifiers 28 and 30 to process any received signal, whether coded or not. If a signal is coded a 15.75 khz decoding signal is superimposed upon the D.C. level. If the entire converter/decoder is to be disabled, the D.C. level from circuit 34 is such that amplifiers 28 and 30 cannot process a received signal.

The message described above is sent out from the CATV head end initially as an address and pre-authorization message consisting of two identical and repetitive message words. The message content need not be repeated as what is essential is for the data channel to be occupied to maintain the decoder in an on condition. As a practical matter the message is repeated in the event power is lost at any subscriber location for more than two or three minutes, which would require re-authorization of that subscriber. For this reason control messages are sent to individual decoders at a rate of approximately 14,000 per minute. In addition, the status of a subscriber may need to be changed, which change can be done at any time and as a result of two successive message words. It is not uncommon to send out subscriber turn-off or disabling messages during a premium program to prevent an unauthorized subscriber from receiving a pay program.

It is important for the tag signal to be continuously transmitted with a coded program. The decoder must continuously detect a tag in order to remain in an enabled condition.

In the example described above, the tag information was in the form of time varying pulses. It is equally satisfactory to use pulses which vary in frequency. In that instance the detector and integrator circuit indicated at 58 may be eliminated and it is only necessary to have an amplifier and a Schmitt trigger. For example, in a frequency variable message there may be a start-bit of 47.2 khz, a one-bit of 78.6 khz and a zero-bit having a frequency of 110.1 khz. Either form of tag is satisfactory.

Whereas the preferred form of the invention has been shown and described herein, it should be realized that there may be many modifications, subsitutions and alterations thereto.

The embodiments of the invention in which an exclusive property or privilege is claimed are defined as follows:

1. A converter/decoder for use in subscription TV including means for converting any input TV channel to a predetermined output channel, decoding means connected to said converting means for decoding a selected input channel after conversion to said output channel, enabling means for said decoding means, each coded TV signal including data describing the program level of the TV signal, said enabling means further including authorization data receiving means for receiving data at a frequency other than that of a TV signal, said enabling means including means for comparing the TV signal program level data with the authorization data and to enable said decoding means when there is correspondence therebetween.

2. The converter/decoder of claim 1 further characterized in that said TV signals are coded by the application of sine wave amplitude modulation to both the audio and video signals, which modulation is suppressed during the video signal vertical interval, said program level data being inserted on the audio signal during the video signal vertical interval.

3. The converter/decoder of claim 2 further characterized in that said program level data includes a series of time variable pulses.

4. The converter/decoder of claim 2 further characterized in that said program level data includes a series of frequency variable pulses.

5. A method of authorizing the presentation of electrically transmitted intelligence to separate subscribers including the steps of:
   (a) transmitting an RF intelligence signal, which signal includes data as to the classification of said intelligence signal,
   (b) transmitting, at a frequency distinct from said RF signal and along the some signal path as said RF signal, an authorization signal, which includes data as to the type of signal authorized for particular subscribers,
   (c) comparing the authorization data and classification data, and
   (d) presenting said transmitted intelligence in an understandable form upon correspondence between said separately transmitted classification data and authorization data.

6. The method of claim 5 further characterized in that said electrically transmitted intelligence is in the form of a television signal, with said classification data being superimposed on a portion of said television signal.

7. The method of claim 5 further characterized in that said transmission, distinct from said RF signal, takes place at a frequency substantially different from that of the RF signal.

8. A method of authorizing the presentation of a coded television signal including the steps of:
   (a) transmitting the coded TV signal with classification data superimposed thereon to a subscriber,
   (b) separately transmitting, at a frequency other than that of a TV signal and along the same signal path as said TV signal, authorization data to a subscriber,
   (c) comparing the separately transmitted classification and authorization data and authorizing decoding of said television signal upon correspondence therebetween.

9. The method of claim 8 further characterized in that said television signal is coded by the application of sine wave amplitude modulation applied to both the audio and video signals, with said sine wave amplitude modulation being suppressed during the video signal vertical interval, the classification data being superimposed on the audio signal during the period of the video signal vertical interval.

10. The method of claim 9 further characterized in that only a portion of the classification data is applied to the audio signal during each video signal vertical interval.

11. The method of claim 8 further characterized in that said separately transmitted authorization data includes individual subscriber address information.

12. The method of claim 11 further characterized in that the separately transmitted authorization data includes a disabling signal for turning off the subscriber decoding equipment.

* * * * *